United States Patent [19]

Budreau

[11] Patent Number: 5,131,832
[45] Date of Patent: Jul. 21, 1992

[54] HEATED ICE CREAM SCOOP APPARATUS

[76] Inventor: Chad P. Budreau, R.R. 4, Box 2, Fowler, Ind. 47944

[21] Appl. No.: 754,634

[22] Filed: Sep. 4, 1991

[51] Int. Cl.$^5$ .......................... A23G 9/00; B29C 67/24
[52] U.S. Cl. ........................................ 425/277; 425/279
[58] Field of Search ............... 425/277, 279, 282, 547, 425/384, 407, 378.1, 276, 143, 144; 431/145, 146, 144

[56] References Cited

U.S. PATENT DOCUMENTS

| | | | |
|---|---|---|---|
| 1,255,906 | 3/1917 | Miller | 425/277 |
| 1,323,523 | 12/1919 | Cox | 425/144 |
| 2,114,470 | 4/1938 | Conner | 425/276 |
| 2,256,770 | 9/1941 | Armstrong | 425/282 |
| 2,351,568 | 6/1944 | Wheaton | 425/276 |
| 2,990,789 | 7/1961 | Smith | 425/282 |
| 3,587,137 | 6/1971 | Baldridge | 425/144 |
| 4,132,518 | 1/1979 | Rips | 425/143 |

*Primary Examiner*—Jay H. Woo
*Assistant Examiner*—Khanh P. Nguyen
*Attorney, Agent, or Firm*—Leon Gilden

[57] ABSTRACT

An ice cream scoop including a ladle formed with an interior wall and exterior wall defining a heating chamber therebetween. The heating chamber including a vent directed through the exterior wall diametrically opposed to an elongate handle, wherein the handle includes a heating assembly mounting a heating cartridge directing heated air supply between the interior and exterior walls of the scoop.

3 Claims, 4 Drawing Sheets

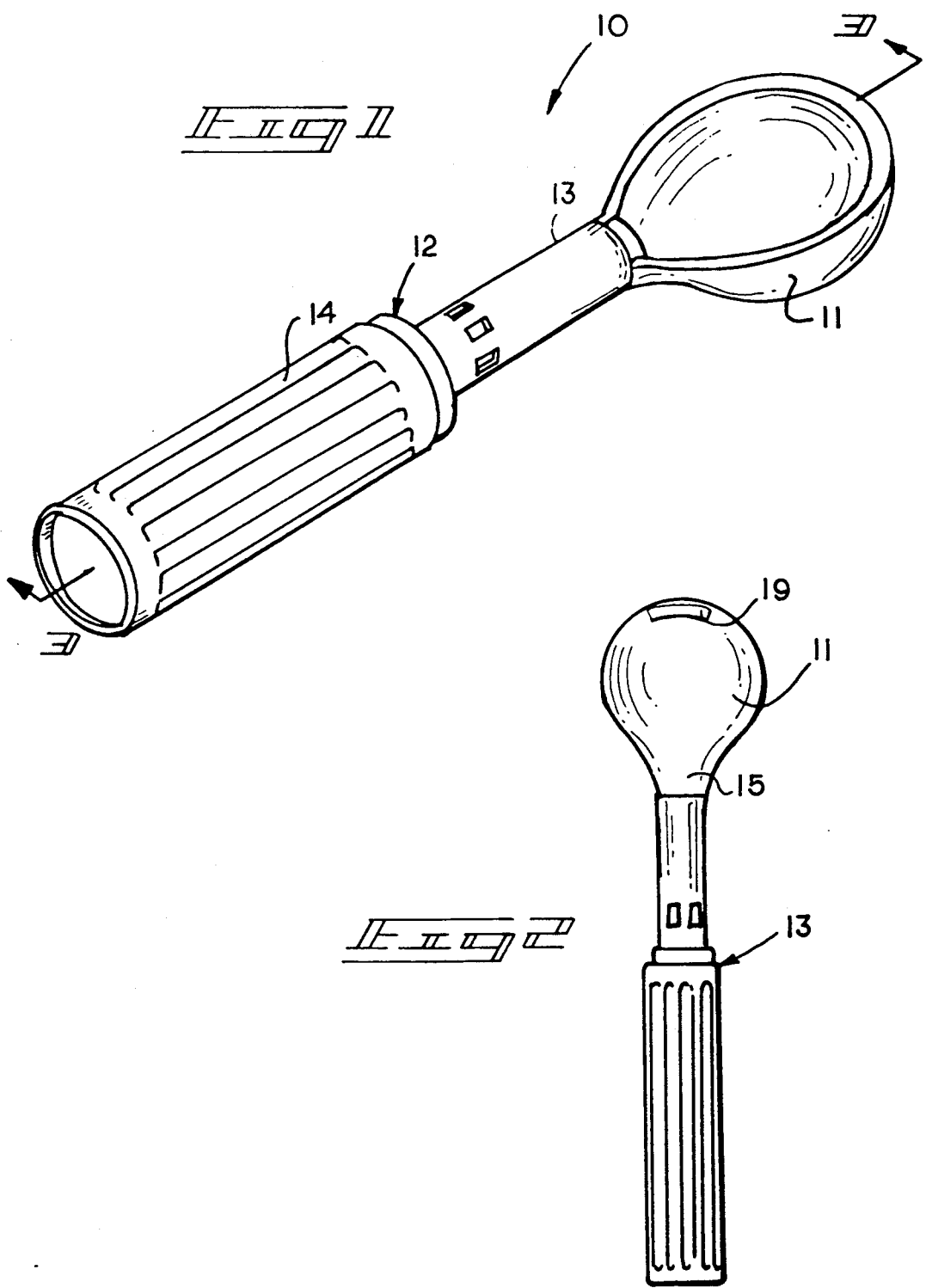

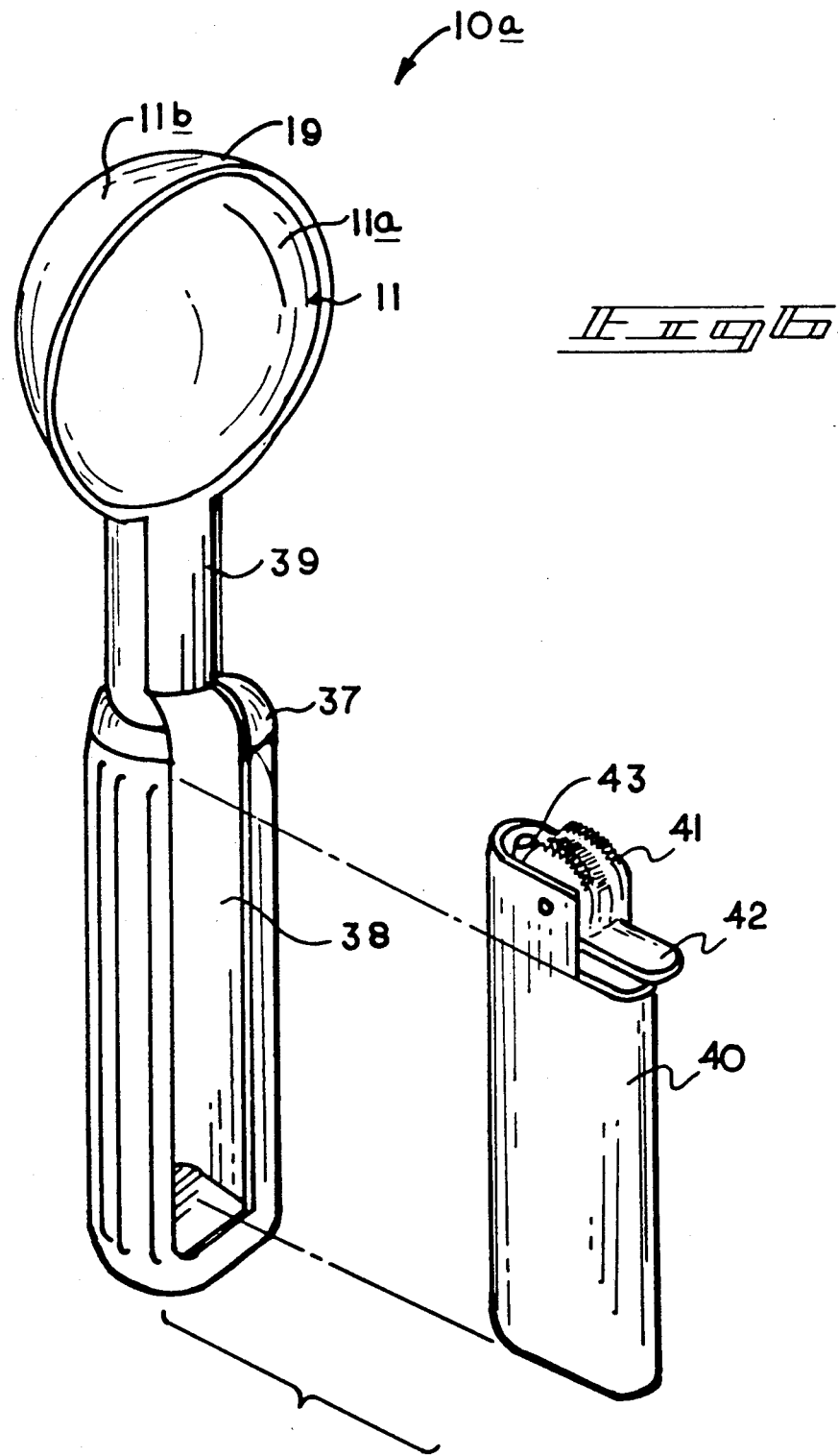

HEATED ICE CREAM SCOOP APPARATUS

BACKGROUND OF THE INVENTION

1. Field of the Invention

The field of invention relates to ice cream scoop apparatus, and more particularly pertains to a new and improved heated ice cream scoop apparatus wherein the same is arranged for accommodating heat to heat the ladle head permitting ease of entry of the scoop into an ice cream container and subsequent ease of release of ice cream from within the scoop apparatus.

2. Description of the Prior Art

A heated ice cream scoop device has been utilized in the prior art, wherein the heated ice cream scoop utilizes electrical resistance elements mounted throughout the scoop head operative through a mount to effect heating of the scoop head.

U.S. Pat. No. 3,476,059 to Anderson sets forth another example of an electrically heated ice cream scoop utilizing resistance elements mounted within the scoop structure.

U.S. Pat. No. 3,992,604 to Leddy sets forth a further example of an electrically heated ice cream dispenser organization.

Accordingly, it may be appreciated that there continues to be a need for a new and improved heated ice cream scoop apparatus as set forth by the instant invention which addresses both the problems of ease of use as well as effectiveness in construction in utilizing a readily replenished butane gas supply in association with the ice cream scoop structure to permit heating of the ice cream scoop ladle and in this respect, the present invention substantially fulfills this need.

SUMMARY OF THE INVENTION

In view of the foregoing disadvantages inherent in the known types of ice cream scoop apparatus now present in the prior art, the present invention provides a heated ice cream scoop apparatus wherein the same is arranged for selective heating of the ice cream scoop ladle head portion. As such, the general purpose of the present invention, which will be described subsequently in greater detail, is to provide a new and improved heated ice cream scoop apparatus which has all the advantages of the prior art ice cream scoop apparatus and none of the disadvantages.

To attain this, the present invention provides an ice cream scoop including a ladle formed with an interior wall and exterior wall defining a heating chamber therebetween. The heating chamber including a vent directed through the exterior wall diametrically opposed to an elongate handle, wherein the handle includes a heating assembly mounting a heating cartridge directing heated air supply between the interior and exterior walls of the scoop.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heated ice cream scoop apparatus which has all the advantages of the prior art ice cream scoop apparatus and none of the disadvantages.

It is another object of the present invention to provide a new and improved heated ice cream scoop apparatus which may be easily and efficiently manufactured and marketed.

It is a further object of the present invention to provide a new and improved heated ice cream scoop apparatus which is of a durable and reliable construction.

An even further object of the present invention is to provide a new and improved heated ice cream scoop apparatus which is susceptible of a low cost of manufacture with regard to both materials and labor, and which accordingly is then susceptible of low prices of sale to the consuming public, thereby making such heated ice cream scoop apparatus economically available to the buying public.

Still yet another object of the present invention is to provide a new and improved heated ice cream scoop apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic rear view, taken in elevation, of the instant invention.

FIG. 6 is an isometric illustration of a modified apparatus utilized by the instant invention.

DESCRIPTION OF THE PREFERRED EMBODIMENT

Figure 3:
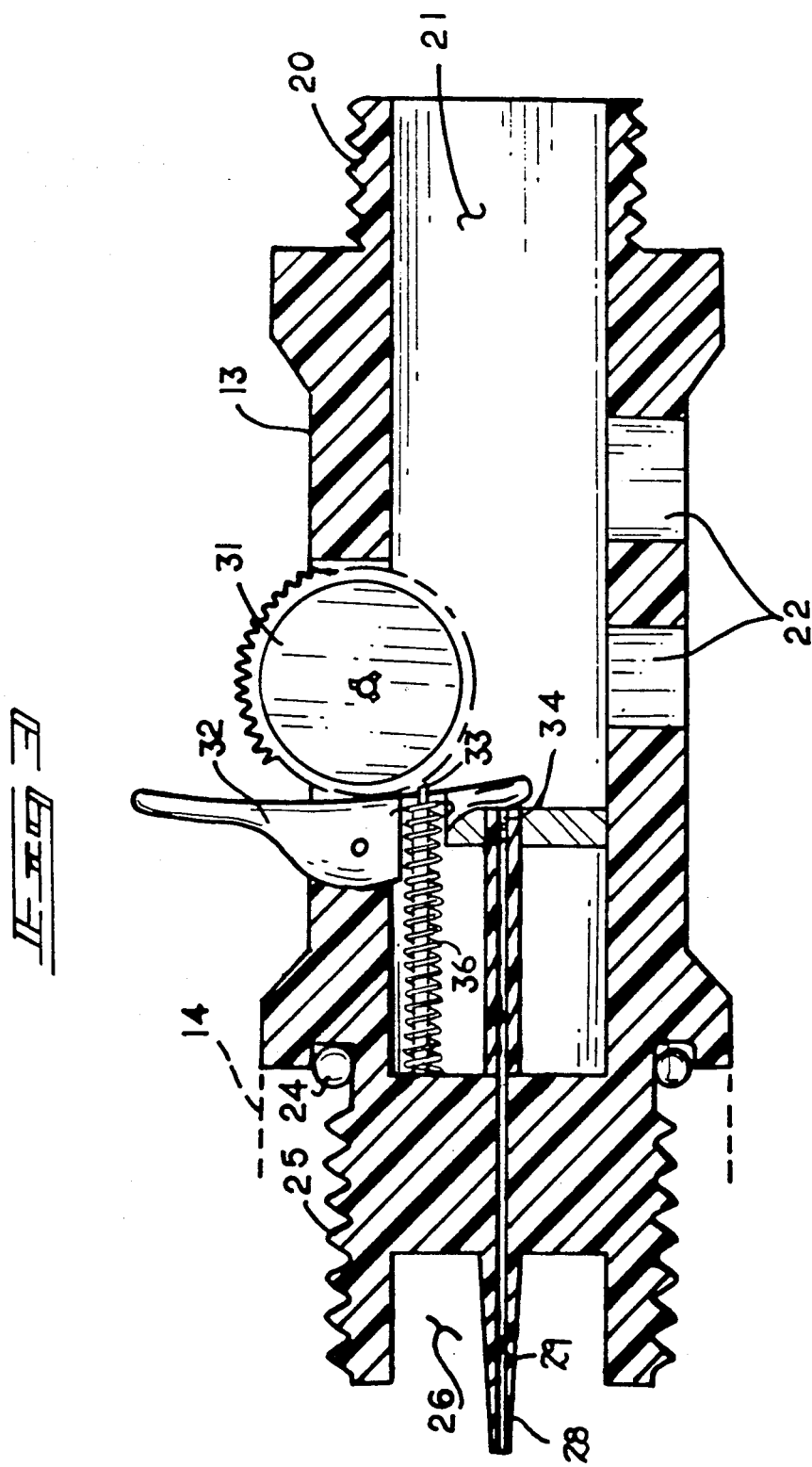
FIG. 3 is an orthographic view, taken along the lines 3—3 of FIG. 1 in the direction indicated by the arrows.
Figure 4:
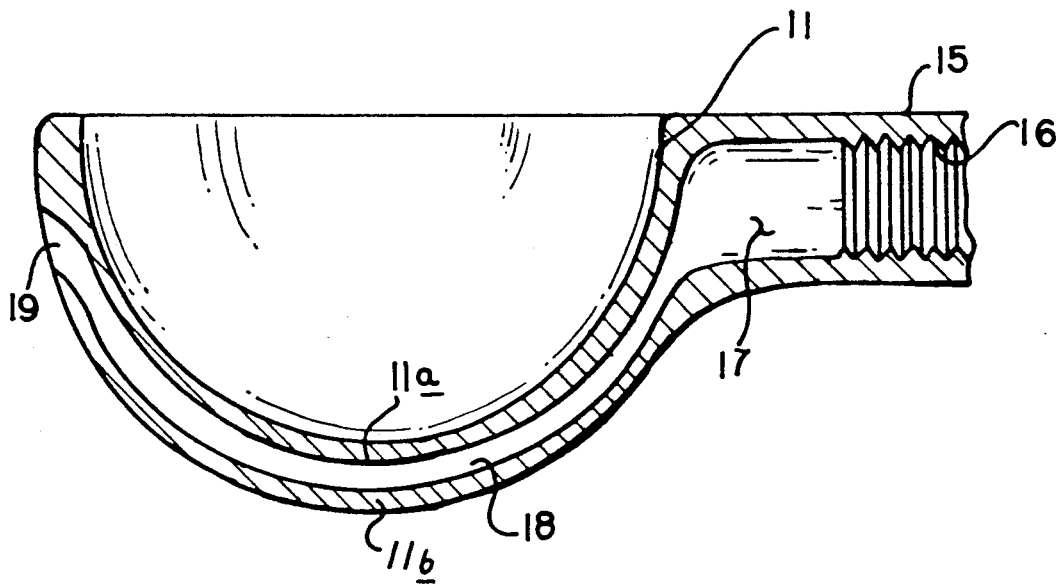
FIG. 4 is an orthographic cross-sectional illustration of the ladle head utilized by the instant invention taken in cross-section.

With reference now to the drawings, and in particular to FIGS. 1 to 6 thereof, a new and improved heated ice cream scoop apparatus embodying the principles and concepts of the present invention and generally designated by the reference numerals 10 and 10a will be described.

Figure 5:
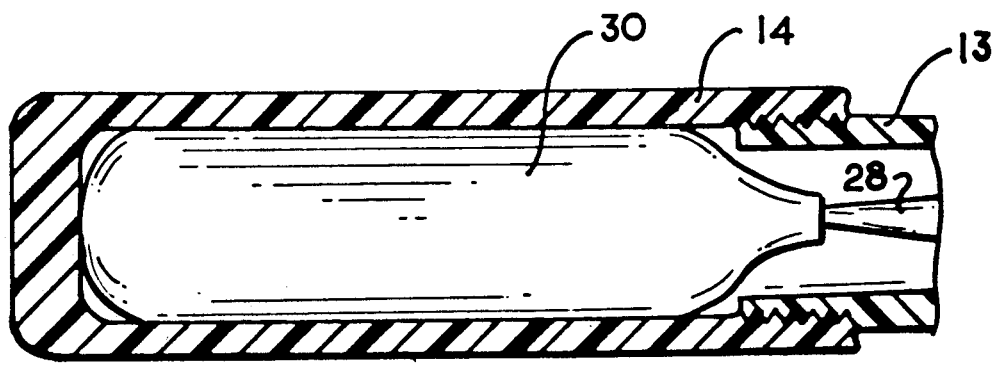
FIG. 5 is an orthographic cross-sectional illustration of the butane lighter cartridge mounted within the lower handle shaft portion.

More specifically, the heated ice cream scoop apparatus 10 of the instant invention essentially comprises a concave ladle head 11 including an interior wall 11a spaced from and coextensive an exterior wall 11b to define a ladle head cavity 18 therebetween. The cavity includes a ladle head vent opening 19 directed through the exterior wall 11b diametrically opposed to an associated ladle shaft 15 diametrically aligned with the ladle head 11. The ladle head 11 and associated ladle shaft 15 are mounted to an upper handle shaft 13 that is in turn mounted to a lower handle shaft 14, wherein each of the shafts 13, 14, and 15 are coaxially aligned relative to one another. The ladle shaft 15 includes internal threads 16 cooperative with and securable to an upper handle shaft externally threaded boss 20. The upper handle shaft boss 20 includes an upper handle shaft conduit 21 coaxially directed therethrough. A plurality of windows 22 are directed through the upper handle shaft 20 adjacent an abrasive striker wheel 31 projecting through a wall of the upper handle shaft 13 to provide air flow in flame propagation of a heated flue aligned by the upper handle shaft conduit 21 and the associated ladle head cavity 18. The abrasive striker wheel 31 cooperates with a flint member 33 to effect striking of a spark, wherein a valve lever 32 pivotally mounted below the striker wheel 31 receiving the flint member 33 therethrough includes a valve lever projection 34 selectively projecting within an upper terminal end of a fuel feed channel 29. A retraction spring 36 is arranged to normally bias the valve lever projection 34 into sealing engagement with the upper terminal portion of the fuel feed channel 29. The fuel feed channel 29 projects through the upper handle shaft 13 and externally threaded lower boss 25 formed on a lower portion of the upper handle shaft 13 to be threadedly received within an internally threaded portion of the lower handle shaft 14, in a manner as depicted in FIG. 5. The lower handle shaft 14 is received threadedly about the externally threaded lower face boss 25 into confrontation and sealing relationship with the annular seal 24. The piercing conduit 28 that includes the fuel feed channel 29 directed therethrough pierces the associated butane cartridge 30 to selectively direct fuel through the fuel feed channel 29 for providing a flame through the upper terminal end of the fuel feed channel 29 in association with the abrasive striker wheel 31.

FIG. 6 illustrates a modified apparatus 10a, wherein a handle member 37 mounted to the concave ladle head 11 includes a handle cavity slot 38, with the handle cavity slot receiving an associated butane lighter member 40 therewithin. The butane lighter member 40 includes a flame outlet nozzle 43 operative through a striker wheel 41 and a valve plate 42 to direct a flame into the handle conduit 39 that subsequently directs the flame into the ladle head cavity 18, in a manner as discussed with reference to FIG. 4.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated ice cream scoop apparatus, comprising,
   a concave ladle head, the ladle head including an interior wall spaced from and coextensive with an exterior wall defining a ladle head cavity therebetween, and
   the ladle head including a handle member radially directed into and secured to the concave ladle head, and the ladle head further including a ladle head vent opening directed through the exterior wall in communication with the ladle head cavity, and
   the handle including a handle shaft conduit, heating means for effecting selective projection of heat within the handle member conduit, the handle shaft conduit positioned adjacent and above said heating means, and
   the handle shaft includes a handle cavity slot, the handle cavity slot coaxially aligned with the handle shaft conduit, and the handle shaft slot including a selectively removable butane lighter member, the butane lighter member including a butane reservoir supply in cooperation with a flame outlet nozzle, and a striker wheel and valve plate mounted to the butane lighter member to effect selective actuation of the butane lighter member to direct a flame from the outlet nozzle, and the outlet nozzle positioned below the handle shaft conduit.

2. An apparatus as set forth in claim 1 wherein the heating means includes a striker wheel mounted rotatably through a wall of the handle shaft, and a valve lever pivotally mounted below the striker wheel, and a fuel feed conduit positioned adjacent the striker wheel, wherein the valve lever includes a valve lever projection mounted to the valve lever interiorly of the handle shaft, wherein the valve lever projection is selectively positioned within the fuel feed channel permitting selective flow of fuel through the fuel feed channel upon pivotment of the valve lever, and biasing means mounted to the valve lever to normally bias the valve lever projection within an upper terminal end of the fuel feed channel, and a plurality of vent windows directed through the handle shaft adjacent the striker wheel and the upper terminal end of the fuel feed conduit to provide air flow to the upper terminal end of the fuel feed channel.

3. An apparatus as set forth in claim 2 wherein the handle member includes an externally threaded lower terminal end, and includes a lower face at a lower terminal end of the handle shaft, and a lower face cylindrical cavity positioned within medially of the externally threaded lower face boss, and a piercing conduit coaxially aligned within the handle shaft, with the piercing conduit including a fuel feed channel directed medially therethrough, and a lower handle shaft including an internally threaded upper terminal end selectively securable to the externally threaded lower handle shaft boss, with the lower handle shaft including a fuel feed container contained therewithin, and the piercing conduit coaxially aligned relative to an upper terminal end of the fuel container.

* * * * *